(12) United States Patent
Van Horne (10) Patent No.: US 9,668,535 B2
(45) Date of Patent: Jun. 6, 2017

(54) SKATE BOOT WITH MONOCOQUE BODY

(71) Applicant: Scott Van Horne, Winnipeg (CA)

(72) Inventor: Scott Van Horne, Winnipeg (CA)

(73) Assignee: VH FOOTWEAR INC., Winnipeg, Manitoba (CA)

( * ) Notice: Subject to any disclaimer, the term of this patent is extended or adjusted under 35 U.S.C. 154(b) by 0 days.

(21) Appl. No.: 15/049,552

(22) Filed: Feb. 22, 2016

(65) Prior Publication Data

US 2016/0166004 A1    Jun. 16, 2016

Related U.S. Application Data

(63) Continuation of application No. 13/802,381, filed on Mar. 13, 2013, now Pat. No. 9,320,315.

(51) Int. Cl.
*A43B 5/16* (2006.01)
*A43B 23/26* (2006.01)
*B29D 35/14* (2010.01)
*B29D 35/00* (2010.01)

(52) U.S. Cl.
CPC .............. *A43B 5/16* (2013.01); *A43B 5/1683* (2013.01); *A43B 5/1691* (2013.01); *A43B 23/26* (2013.01); *B29D 35/0054* (2013.01); *B29D 35/146* (2013.01)

(58) Field of Classification Search
CPC ............ B29D 35/0054; B29D 35/0072; B29D 35/146; B29D 35/126; A43B 5/16666; A43B 5/1683; A43B 5/1691; A43B 5/0484

USPC ........................................................... 12/145
See application file for complete search history.

(56) References Cited

U.S. PATENT DOCUMENTS

| | | |
|---|---|---|
| 5,234,230 A | 8/1993 | Crane et al. |
| 5,566,476 A | 10/1996 | Bertrand et al. |
| 5,829,170 A | 11/1998 | Lutz, Jr. |
| 6,854,200 B2 | 2/2005 | Hipp et al. |
| 7,140,127 B2 | 11/2006 | Yang |
| 7,219,900 B2 | 5/2007 | Meibock |
| 7,398,609 B2 | 7/2008 | Labonte |
| 7,549,185 B2 * | 6/2009 | Yang ................... A43B 5/1666 12/142 P |
| 8,387,286 B2 * | 3/2013 | Koyess ............... A43B 5/1616 12/142 R |

(Continued)

*Primary Examiner* — Ted Kavanaugh
(74) *Attorney, Agent, or Firm* — Ryan W. Dupuis; Kyle R. Satterthwaire; Ade & Company Inc.

(57) ABSTRACT

A skate boot for receiving a wearer's foot comprising: a monocoque skate boot body comprising a heel portion; a toe box portion; a sole portion; an ankle portion; a lower Achilles tendon portion located directly above the heel portion; an upper Achilles tendon portion for receiving a tendon guard; an eyelet cuff portion, the eyelet cuff portion houses the eyelet holes, through which eyelets are installed, through which a lace is utilized to tighten the skate boot to the wearer's foot. Also included, a liner portion, integrated into the monocoque skate body, comprised of foam for cushioning the wearer's foot, bonded to a material layer for providing comfort against the wearer's skin, an outer shell bonded and stitched to the outer surface of the monocoque skate boot body, a tendon guard secured to the upper Achilles tendon portion with freedom to adjust the position, and a tongue attached to the toe box portion with freedom to adjust the position.

5 Claims, 12 Drawing Sheets

(56) References Cited

U.S. PATENT DOCUMENTS

| | | | | |
|---|---|---|---|---|
| 2001/0003876 A1* | 6/2001 | Racine | ................. | A43B 5/1683 36/115 |
| 2004/0226113 A1* | 11/2004 | Wright | ................. | A43B 5/1666 12/145 |
| 2005/0210709 A1* | 9/2005 | Labonte | ............... | B29D 35/146 36/89 |
| 2008/0172906 A1* | 7/2008 | Jou | ...................... | A43B 5/1666 36/115 |

* cited by examiner

SKATE BOOT WITH MONOCOQUE BODY

This application is a continuation of U.S. application Ser. No. 13/802,381, filed Mar. 13, 2013 which is currently pending.

FIELD OF THE INVENTION

The present invention relates to the skate boot commonly used with an ice skate blade and holder (although not exclusively).

BACKGROUND

The current trend in skate boot construction is to manufacture the boot from multiple components of thermoformed and injection molded plastic. The main structure of the boot is commonly thermoformed on a compression mold that shapes a flat sheet of plastic into a 3D structure. The main limitation of this method is that seams are created where the thermoformed material meets and therefore require a reinforcing element to bridge the seams. As commonly seen in the prior art the resulting seam through the center of the sole needs to be reinforced with a rigid midsole and outsole. This adds weight and the potential for premature breakdown and wear through the sole of the boot. An example of this in the prior art is disclosed in U.S. Pat. No. 7,398,609.

Some alternative skate boot construction can be found in U.S. Pat. Nos. 7,219,900 and 7,140,127 where the authors disclose a support structure composed of carbon fiber and the like, which has the liner, eyelet cuff, tendon guard, and external cuff bonded to the already fabricated support structure. With this process it is difficult to bond the liner into the already fabricated support structure cleanly and smoothly, creating inconsistency in the final product and higher reject rates. The eyelet cuff is not substantially integrated into the support structure and is only bonded and/or stitched to the support structure, therefore when the laces are tightened the bonded eyelet cuff bends around the support structure and does not uniformly pull the skate boot body over the instep of the wearer's foot. Also, the tendon guard is only bonded to the top of the support structure creating the potential for accelerated wear as the wearer extends their ankle and forces the tendon guard to flex back and then forth. With all current boot construction methods the tongue is permanently attached to the main boot body, and the main disadvantage of this is that the position of the tongue with respect to the skate boot body cannot be adjusted to the preference of the wearer.

Another limitation of the current construction of skate boots is the composition of the area covering the instep of the wearer's foot. This area needs to be constructed with wearer comfort and function as primary manifestations, and therefore cannot be constructed to also adequately protect the foot from the impact of a fast moving hockey puck. U.S. Pat. Nos. 6,854,200, 5,829,170, 5,566,476, 5,234,230 discloses some manifestation of a protective plastic cover that covers at least the lace area of the skate boot. The major limitation of these inventions is that the resulting product is not being widely used and players continue to suffer foot injuries. Some reasoning for the lack of use are that the protectors do not fit tight enough to the skate boot, which creates obstruction to the wearer while striding. Also, players complain that they need to see laces to feel comfortable when they look down while striding. Also, the plastic covers tend to be heavy and thick which also turns off the players.

The present invention provides a skate boot to mitigate or obviate the aforementioned problems with the current state of the art.

SUMMARY OF THE INVENTION

According to one aspect of the invention there is provided a method of fabricating a skate boot body for a skate boot in which the skate boot body comprises i) a sole portion for receiving an insole and a foot of a wearer on an inner side and an ice skate blade holder on an outer surface thereof, ii) a heel portion at one end of the sole portion for receiving a heel of the foot of the wearer, iii) an ankle portion for receiving ankles of the wearer, iv) a lower Achilles tendon portion for receiving a base of an Achilles tendon of the wearer, v) an upper Achilles tendon portion above said lower Achilles tendon portion, and vi) a cuff portion extending upwardly from sides of the sole portion for receiving a top of the foot, wherein the heel portion, the sole portion, the ankle portion, the lower Achilles tendon portion, the upper Achilles tendon portion and the cuff portion are integrally formed with one another as a monocoque structure, the method comprising:
 (a) providing a foot last;
 (b) positioning a liner portion, adapted to cushion the foot of the wearer in the skate boot body, on the foot last;
 (c) layering wet composite material over said liner portion; and
 (d) vacuum bagging and heating the wet composite material until the wet composite material has cured into a rigid composite structure matrix defining the monocoque structure of the skate boot body with said liner portion integrated therein.

The method may further include forming said liner portion of foam bonded to a material layer. Thermo-formable plastic pieces may be layered on said liner portion on the foot last prior to the layering the wet composite material onto the foot last.

Eyelets may be into eyelet holes in the cuff portion of the monocoque structure of the skate boot body for receiving a lace to tighten the monocoque skate boot body about the foot of the wearer.

The method may further include i) providing a protruding build-out on the foot last in proximity to an Achilles tendon area of the foot last and layering the wet composite material about the protruding build-out on the foot last so as to define a recess on an inner surface of the monocoque structure of the skate boot body, and ii) mounting a bottom end of a tendon guard into the recess on the inner surface of the monocoque structure of the skate boot body such that the tendon guard is adapted to span an Achilles tendon of the wearer.

Embodiments of the present invention provide a skate boot for receiving a wearer's foot comprising: a monocoque skate boot body comprising a heel portion for receiving the heel of the foot; a toe box portion for receiving the toes of the foot; a sole portion for receiving an insole on the inner side, and for receiving an ice skate blade holder and the like on the outer surface, the sole portion comprising an arch section for supporting the medial longitudinal arch of the foot; an ankle portion for receiving the wearer's ankles; a lower Achilles tendon portion for receiving the base of the wearer's Achilles tendon, the lower Achilles tendon portion is located directly above the heel portion; an upper Achilles tendon portion for receiving a tendon guard ; an eyelet cuff portion for receiving the top of the foot, the eyelet cuff portion houses the eyelet holes, through which eyelets are installed, through which a lace is utilized to tighten the skate boot to the wearer's foot.

Also included, a liner portion comprised of foam for cushioning the wearer's foot, bonded to a material layer for providing comfort against the wearer's skin, an outer shell bonded and stitched to the outer surface of the monocoque skate boot body, a tendon guard secured to the upper Achilles tendon portion, and a tongue attached to the toe box portion.

The main objectives of the present invention is to provide a skate boot which is more comfortable, more supportive, provides for customization of the tongue and tendon to the wearer's preference, has superior protection and durability, and incorporated a fabrication process that is more efficient and that reduces the rejection rate.

Detailed explanation and further objectives, and novel features of the invention are presented in the following detailed description when taken in conjunction with the accompanying drawings.

BRIEF DESCRIPTION OF THE DRAWINGS

The preferred and alternative embodiments of the present invention are described in detail below with reference to the following drawings.

In the drawings like characters of reference indicate corresponding parts in the different figures.

DETAILED DESCRIPTION

Figure 1:
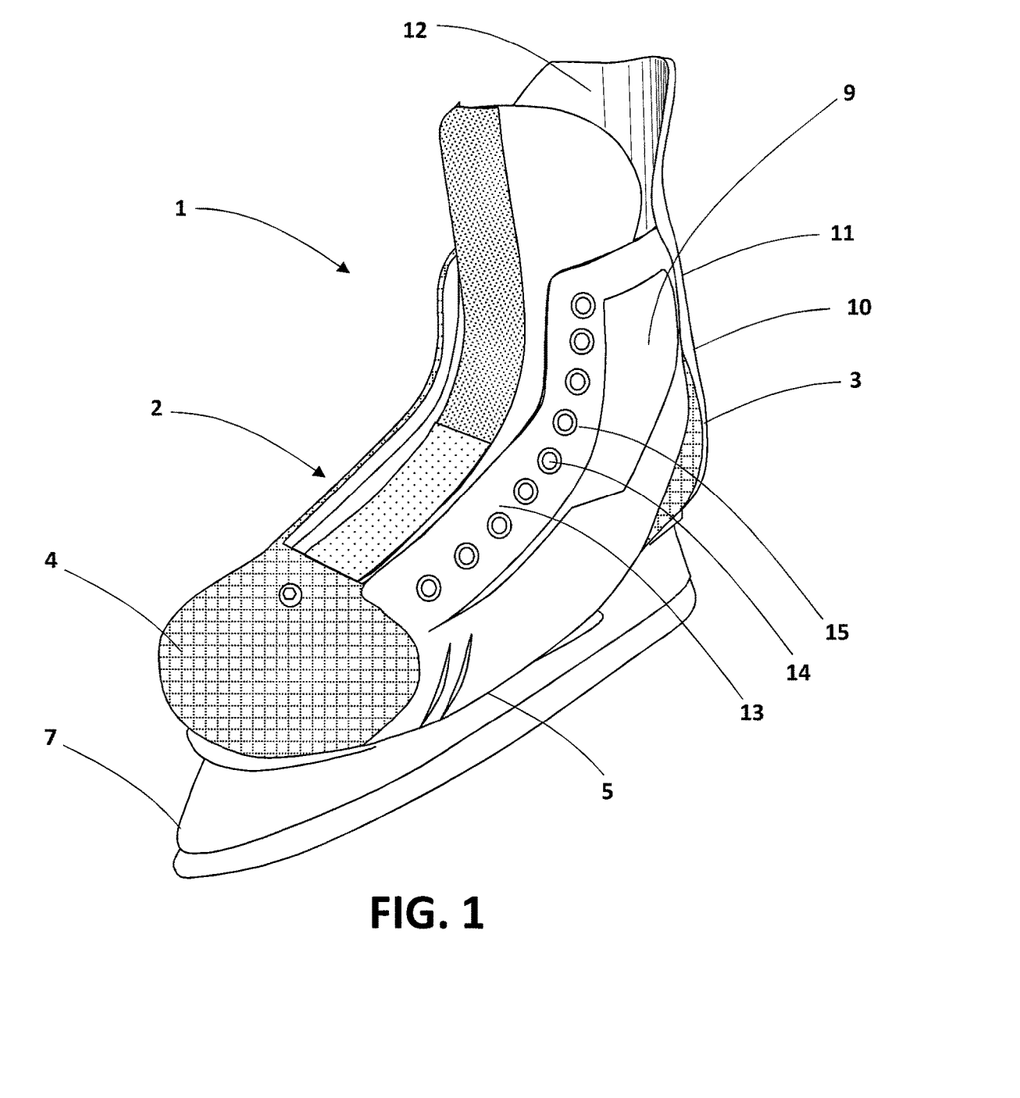
FIG. 1 is a perspective view of a skate boot in accordance with the present invention, with an attached skate blade and holder.

FIG. 1 is a perspective view of a skate utilizing the preferred embodiments of the present invention, including a skate boot 1 for receiving a wearer's foot comprising: a monocoque skate boot body 2 comprising a heel portion 3 for receiving the heel of the foot; a toe box portion 4 for receiving the toes of the foot; a sole portion 5 for receiving an insole 6 (displayed in FIG. 2) on the inner side, and for receiving an ice skate blade holder 7 and the like on the outer surface, said sole portion comprising an arch section 8 (displayed in FIG. 4) for supporting the medial longitudinal arch of the foot; an ankle portion 9 for receiving the wearer's ankle; a lower Achilles tendon portion 10 for receiving the base of the wearer's Achilles tendon, the lower Achilles tendon portion 10 is located directly above the heel portion 3; an upper Achilles tendon portion 11 for receiving a tendon guard 12; an eyelet cuff portion 13 for receiving the top of the foot, the eyelet cuff portion 13 houses the eyelet holes 14, through which eyelets 15 are installed, through which a lace is utilized to tighten the skate boot to the wearer's foot (lace not shown). The advantage of having the eyelet cuff portion 13 integrated and part of the monocoque skate boot body 2 is: as the laces are tightened the entire boot wraps consistently, and more evenly, over the instep of the wearer's foot, creating a more secure, more effective fastening, which is more comfortable and more supportive.

Figure 2:
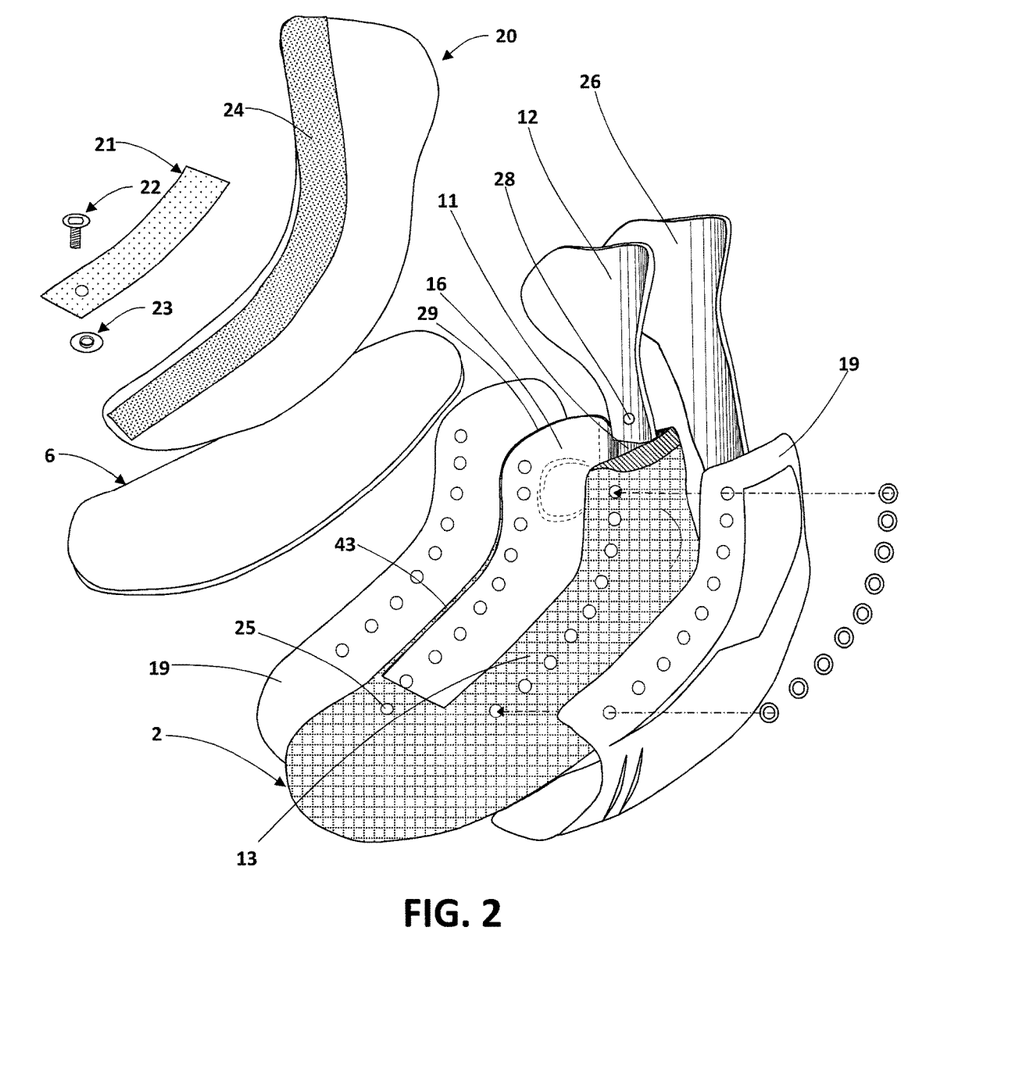
FIG. 2 is an exploded view of the skate boot of FIG. 1.
Figure 5:
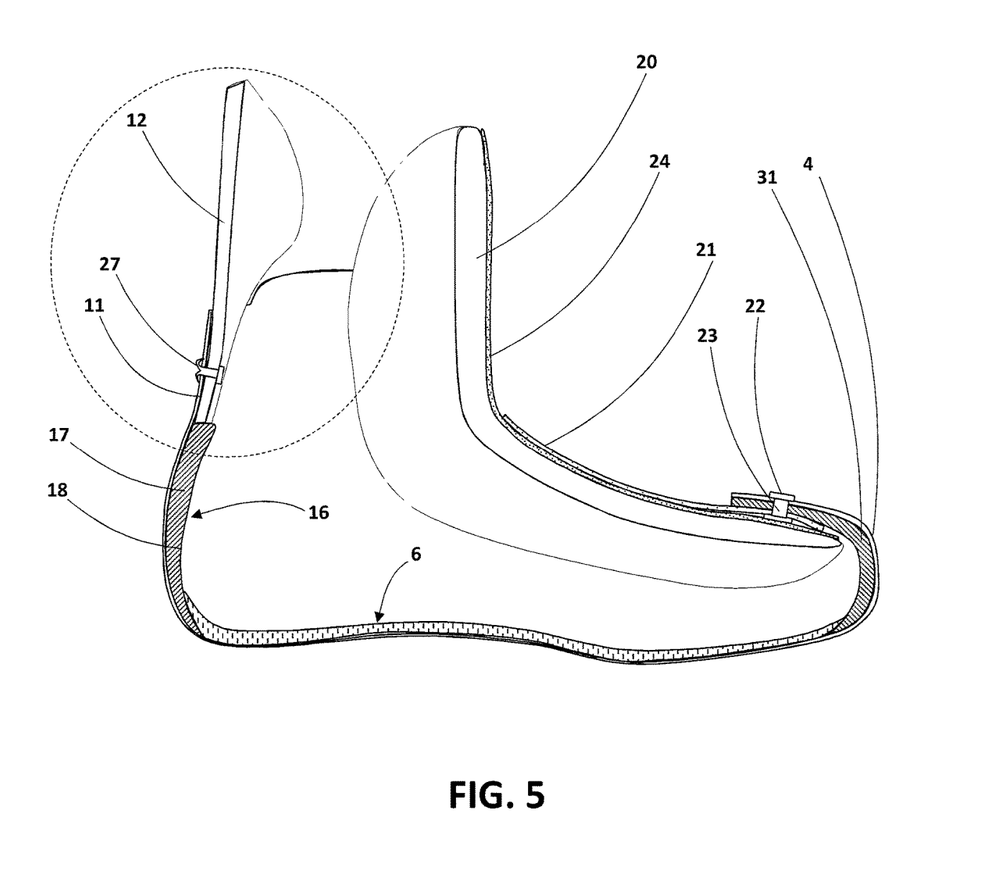
FIG. 5 is a cross sectional view of the monocoque skate boot body, with the tongue and tendon guard installed, in accordance with the present invention, with the sectional view along the line "5-5" in FIG. 3.

As displayed in FIG. 2 and FIG. 5 a liner portion 16 is included and comprised of foam 17 for cushioning the wearer's foot bonded to a material layer 18 for providing comfort against the wearer's skin. An outer shell 19 is bonded and stitched to the outer surface of the monocoque skate boot body 2, and the liner portion 16, along the eyelet cuff edge 43 and the top edge 29 on the medial and lateral sides. A tongue 20 is attached to the toe box 4.

FIG. 2 is an exploded view of the skate boot 1 wherein the tongue 20 is shown to be removably attached to the monocoque skate boot body 2 with a hook and loop fastening strip 21. In the current embodiment the hook strip is shown to be the fastening strip 21 and the loop strip 24 is shown to be sewn to the top surface of the tongue 20, but this arrangement is interchangeable. The fastening strip 21 is attached to the underside of the box toe portion 4 via a t-nut 23, and on top, a bolt 22 through the hole 25, but could alternatively be attached through rivets, adhesives, and the like. This arrangement is also clearly shown in FIG. 5. When the hook strip, fastening strip 21 engages the loop strip 24 the tongue 20 is mechanically held in place. The advantage of this embodiment is that the position of the tongue 20 can be modified and customized to the wearer's preference. Therefore, the position of the tongue 20 can be shifted in a proximal direction to the wear's instep for increased lower leg support, or alternatively it can be shifted in a distal direction to the wearer's instep for increased forward flexion (dorsi flexion) of the ankle joint. To shift the tongue 20 the wearer simply needs to lift the fastening strip 21 from the loop strip 24, reposition the tongue 20, and then press the fastening strip 21 back down.

FIG. 2 also shows the tendon guard 12. In the present embodiment the tendon guard 12 has an optional outer tendon guard cover 26 which is firstly bonded and stitched to the tendon guard 12, and secondly bonded to the outside of the monocoque skate boot body 2, after, the tendon guard 12 is secured to the inner side of the upper Achilles tendon portion 11. In a preferred embodiment the tendon guard 12 is attached to the inside of the upper Achilles tendon portion 11 by a rivet 27 (displayed in FIG. 4 and FIG. 5), through the hole 28, but in alternate embodiments the tendon guard 12 could also be attached via bolts, contact adhesive, thermoset adhesives, and the like. An a preferred embodiment the tendon guard 12 is comprised of carbon fiber, aramid fiber, glass fiber, and the like, impregnated with a liquid resin that when activated cures to form a rigid composite structure matrix, but the tendon guard 12 is not limited to only this material composition, and could also be constructed from a plastic type material and/or a hybrid of composite fibers and a plastic type resin. All other tendon guards are made of plastic type materials: polyester, polyurethane and polyamide. Advantages of the tendon guard 12 being composed of a rigid composite structure matrix over plastic type materials is lighter weight, better rigidity, better protection, and better durability.

Figure 3:
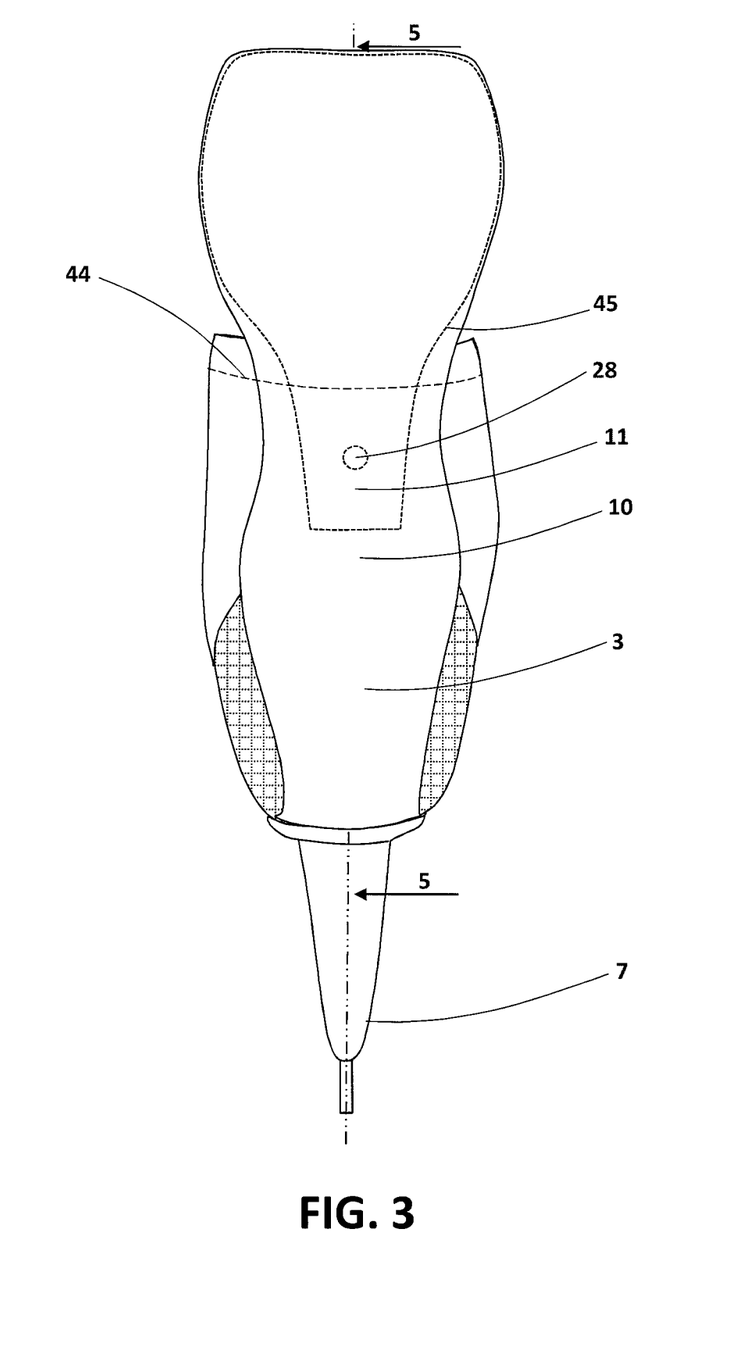
FIG. 3 is a rear elevation view of a skate boot in accordance with the present invention, with an attached skate blade and holder.

FIG. 3 is a rear elevation view of the skate boot 1 with a blade and holder 7 attached. The top of the ankle portion 9 is represented by a dashed line 44. The position and shape of the tendon guard 12 is represented by a dotted line 45.

Figure 4:
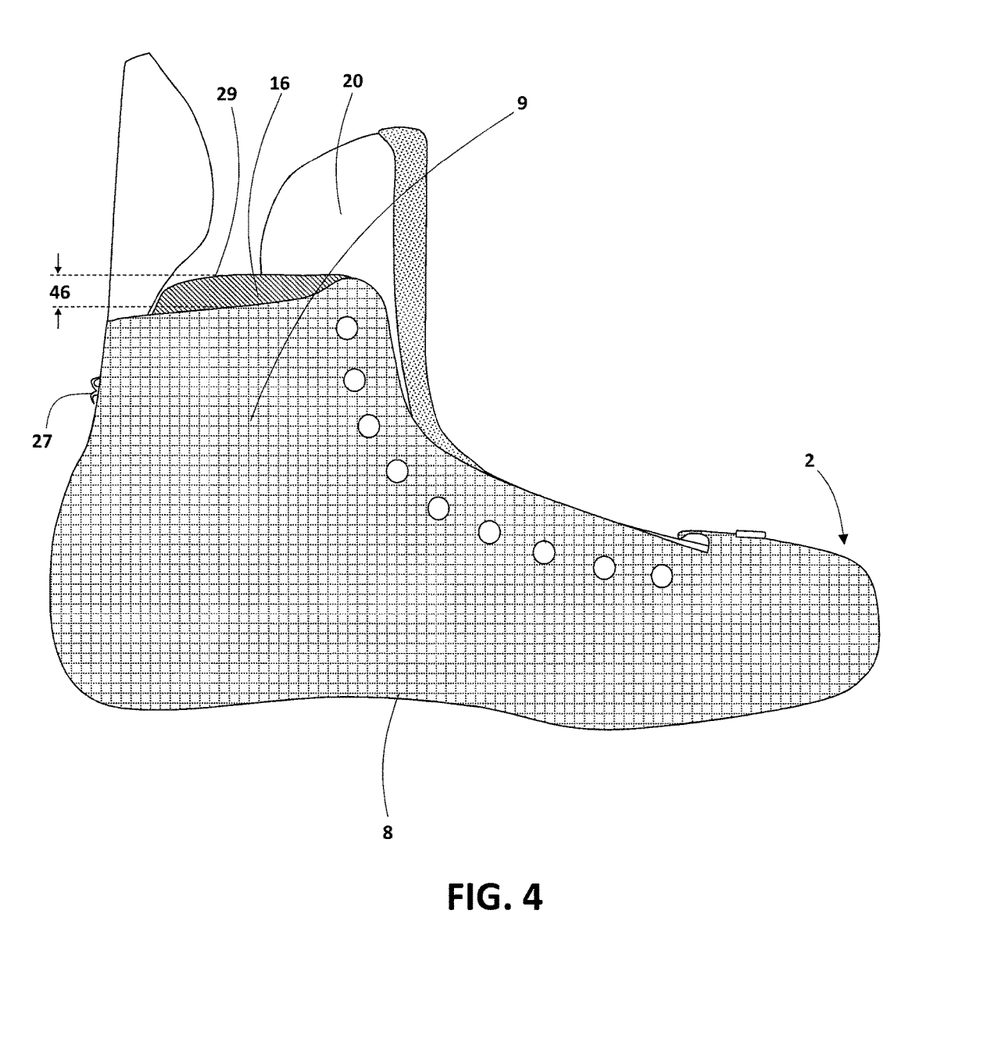
FIG. 4 is a side elevation view of the monocoque skate boot body, with the tongue and tendon guard installed, in accordance with the present invention.

FIG. 4 shows a side elevation view of the monocoque skate boot body 2 with the tongue 20 and tendon guard 12 installed. In a preferred embodiment of the current invention, the top of the ankle portion 9 extends above the wearer's ankle to a point of no less than an optimal distance 46 of 5 mm below the top edge 29 of the medial and lateral sides, with the liner portion 16 extending to the top edge 29. Most other skate boots have a rigid material extending above the wearer's ankle all the way to the top edge, which while aggressive edging, when the ankle joint is in an inverted or everted position, digs into the wearer's leg. The advantage of this preferred embodiment is that the top 5 mm of soft liner portion 16 and flexible outer shell 19 cushions the wearer's leg during aggressive edging, and protects against the top edge of the monocoque skate boot body 2, located 5 mm lower, digging into their leg.

The monocoque skate boot body 2 is comprised of carbon fiber, aramid fiber, glass fiber, and the like, impregnated with a liquid resin that when activated cures to form a rigid composite structure matrix. The monocoque skate boot body 2 has strategically placed thermo-formable plastic regions 30 (represented with a dotted line in FIG. 10B) integrated into the rigid composite structure matrix, but not limited to the area shown. The thermo-formable plastic regions 30 are located in the present embodiment, but not limited to, the region of the lateral/medial ankle bones to provide for comfortable reshaping to the wearer's ankle bones, and within the eyelet cuff portion to provide more flexibility for greater ease when the wearer puts the skate boot 1 on and off. The thermo-formable plastic regions 30 can be softened at temperatures below 80° C. so that the wearer can heat mold the skate boot 1 directly to their foot, creating a custom fit when cooled. The wearer can follow a general heat molding process, which involves baking the skate in a conventional oven for 20 minutes at 82° C. The low melting temperature of the thermo-formable plastic also allows for greater ease of positioning and shaping of such material during the fabrication of the monocoque skate boot body 2.

FIG. 5 shows a cross sectional view of the monocoque skate boot body 2 with the tendon guard and tongue attached. In this drawing many elements can be seen: The fastening strip 21 attached to the underside of the toe box portion 4 via a t-nut 23 and bolt 22, the insole 6 for receiving the sole of the wearer's foot, the upper Achilles tendon portion 11 for receiving the tendon guard 12, the toe box portion 4 completely lined on the inner most side with toe foam 31 to provide comfort and protection to the wearer's toes, the liner portion 16 that is comprised of foam 17 for cushioning the wearer's foot, bonded to a material layer 18 for providing comfort against the wearer's skin.

Figure 6:
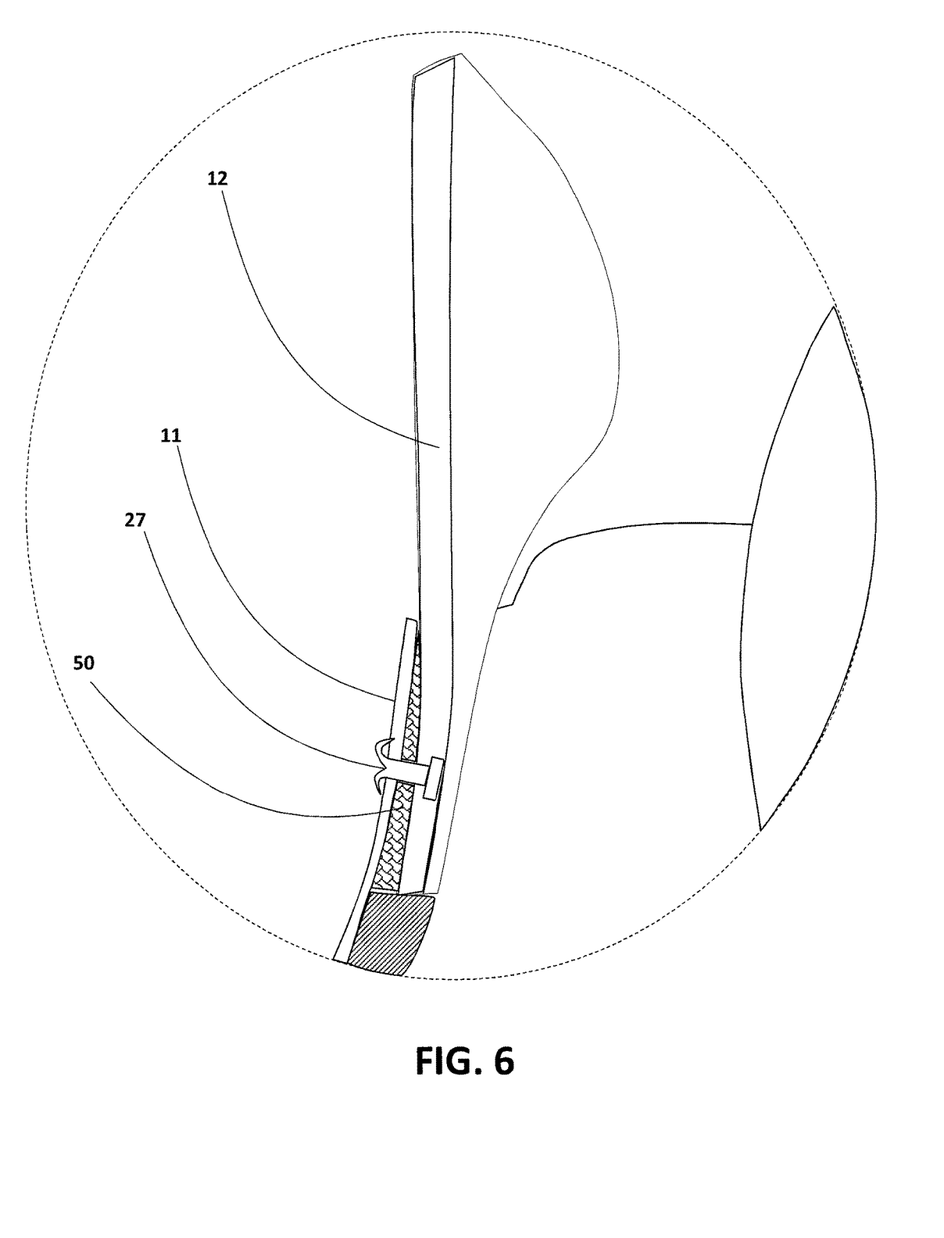
FIG. 6 is a blown-up cross sectional view, of the dotted circle in FIG. 5, of another embodiment in accordance with the present invention.
Figure 7:
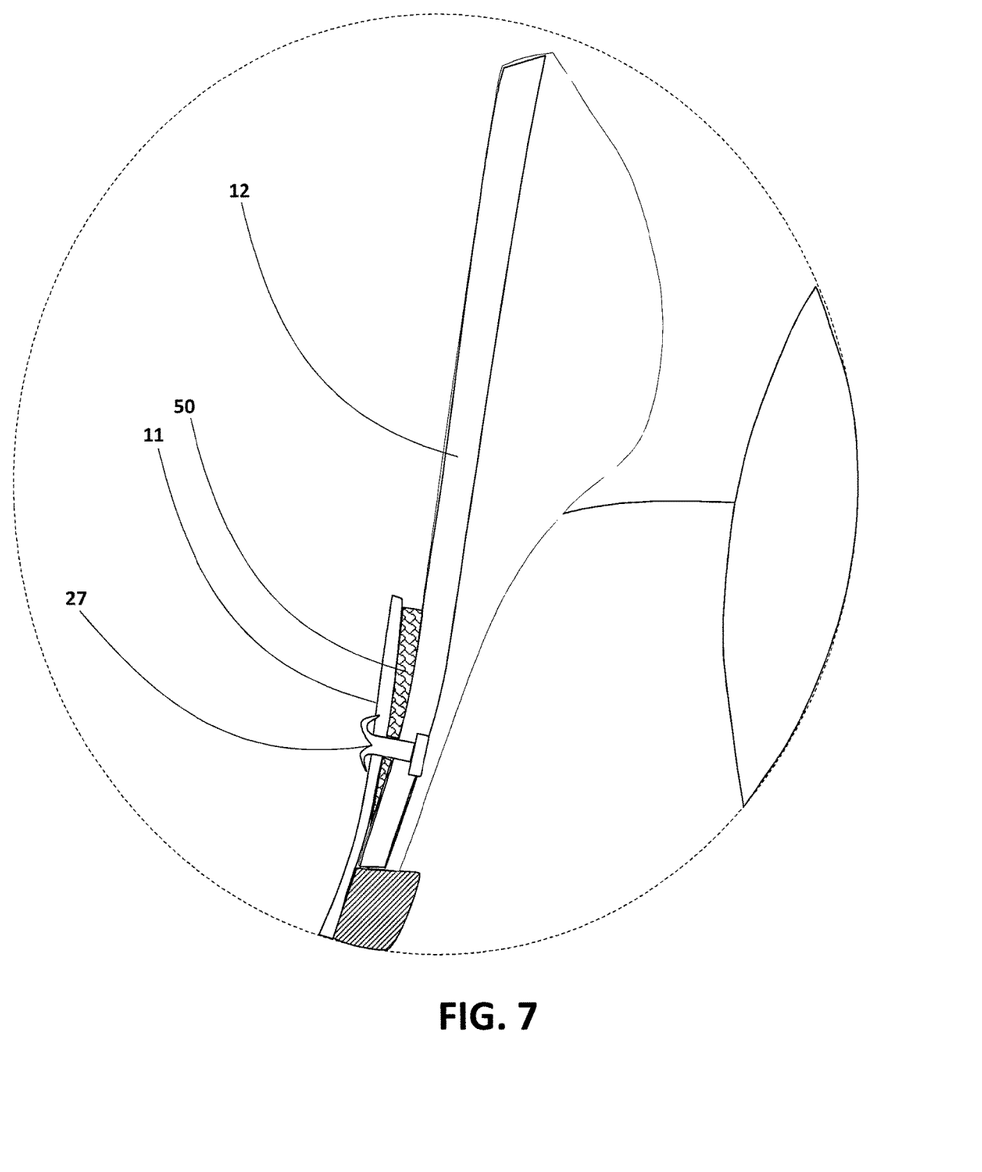
FIG. 7 is a blown-up cross sectional view, of the dotted circle in FIG. 5, of another embodiment in accordance with the present invention.

FIG. 6 and FIG. 7 show a blown-up cross section of the dotted circle in FIG. 5, which shows the upper Achilles tendon portion 11 and the tendon guard 12. The upper Achilles tendon portion 11 is formed into a recess that mates with the tendon guard 12 on the superficial side, and in a preferred embodiment, is attached together by a rivet 27, but could also be attached using other means. As can be appreciated with the current invention the tendon guard 12 is incorporated deeper into the body of the skate than the prior art, making the coupling more structurally sound, and more resistant to wear.

In an alternative embodiment, the upper Achilles tendon portion 11 and the tendon guard 12 are positioned and fastened with a shim 50 between them. FIG. 6 shows the tendon guard shimmed in a posterior angle. Depending on the size of the shim 50, and the direction of the shim 50, this alternative embodiment provides for the ability to adjust the angular position of the tendon guard 12 to custom tailor it to the wearer's preference. As some wearers prefer a large ankle extension and the resulting increased range of motion, but still require the support and protection of a stiff tendon guard, shimming the tendon 12 in a posterior angle, as shown in FIG. 6, will accomplish this. Most wearers prefer a neutral angled tendon guard (displayed in FIG. 5), requiring no shim. Some wearers also prefer an aggressive angled tendon guard, and as depicted in FIG. 7, shimming the tendon 12 in an anterior angle will accomplish this.

Figure 8A:
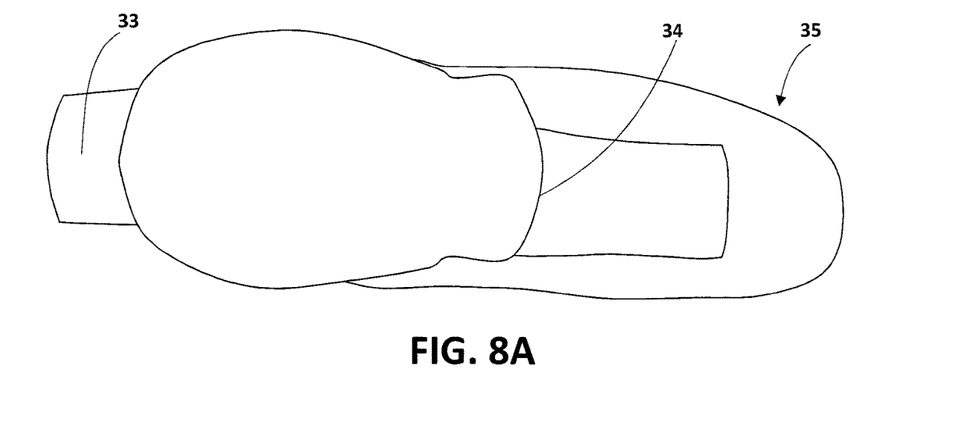
FIG. 8A is a side elevation view of the foot last utilized in accordance with the present invention.
Figure 8B:
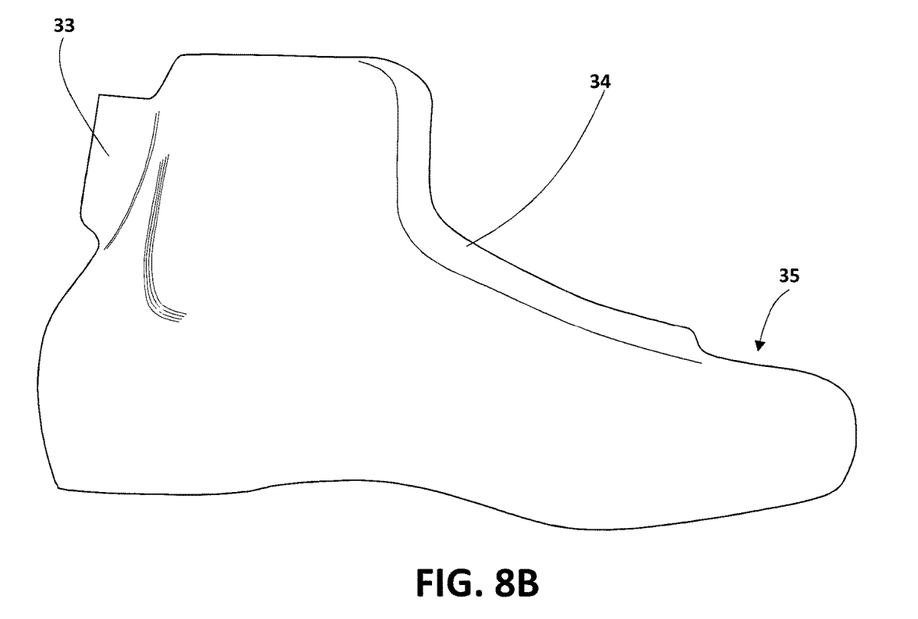
FIG. 8B is a top elevation view of the foot last utilized in accordance with the present invention.

FIG. 8A shows a side elevation view, and FIG. 8B shows a top elevation view of the uniquely shaped anatomically advanced foot last 35 required for fabrication of the monocoque skate boot body 2. Because of the complexity and detail in the foot last shape a new production technique was developed to accurately create the 3D shape. Traditional methods do not have the cutting precision needed to mill the shape accurately. The proprietary shape of the internal foot last 35 results in some of the preferred embodiment of the present invention: build-out 33, when laminated over, creates the upper Achilles tendon portion 11, which is a recess (female) that mates with the tendon guard 12 (male), build-out 34, when laminated to the edge, creates the perfect spacing between the edge 43 of the eyelet cuff portions 13 on the medial and lateral side. Build-out 33 and 34 also act as positioning guides for the placement of the liner 16 during fabrication.

Figure 9A:
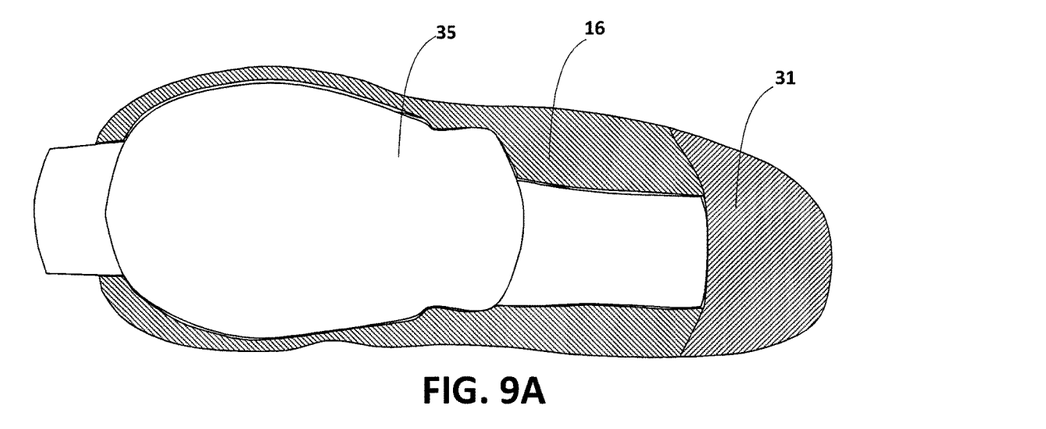
FIG. 9A is a side elevation view of the foot last of FIG. 8A with the liner and toe foam installed.
Figure 9B:
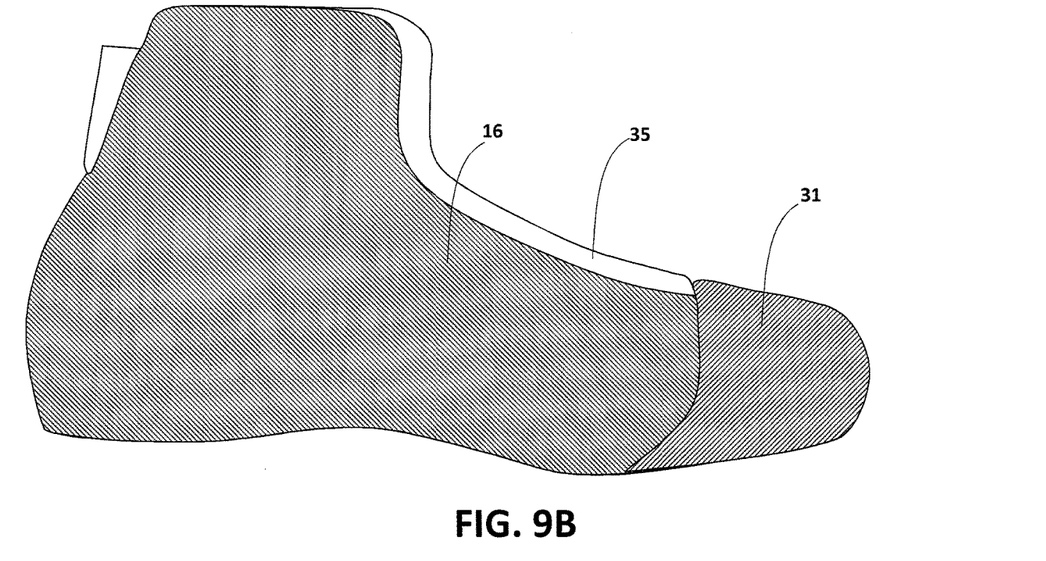
FIG. 9B is a top elevation view of the foot last of FIG. 8B with the liner and toe foam installed.

FIG. 9A shows a side elevation view, and FIG. 9B shows a top elevation view of the positioning of the liner 16 and the toe foam 31 on the internal foot last 35. This is the start of the layering up fabrication process that produces the monocoque skate boot body 2. Other fabrication techniques known in the prior art require the liner portion to be bonded in after the support structure has been formed. The advantage of positioning the liner on an internal foot last and then laminating over top is the result that the liner is integrated into the support structure, in the correct position, with no wrinkles. Therefore, decreasing production time and decreasing the rejection rate.

Figure 10A:
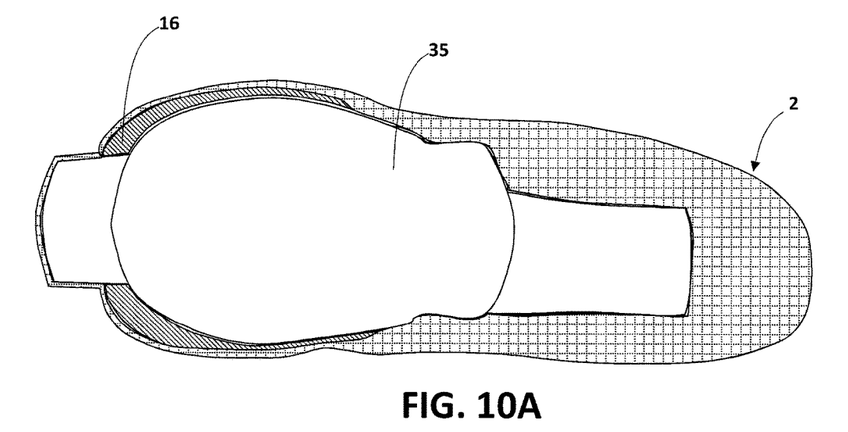
FIG. 10A is a side elevation view of the foot last of FIG. 8A with the post fabrication monocoque skate boot body.
Figure 10B:
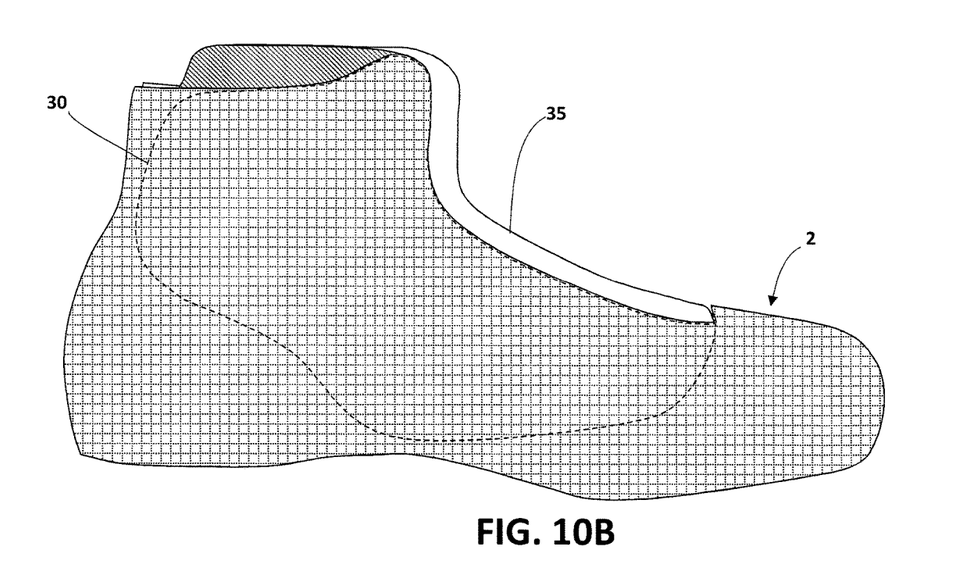
FIG. 10B is a top elevation view of the foot last of FIG. 8B with the post fabrication monocoque skate boot body.

FIG. 10A shows a side elevation view, and FIG. 10B shows a top elevation view of the post fabrication monocoque skate boot body 2 which is fabricated through a wet lay-up process, wherein resin wetted composite (woven fiber material composed of carbon fiber, aramid fiber, glass fiber, and the like, which have been impregnated with activated resin) is laid over the combination of materials shown in FIG. 9A and FIG. 9B, and then vacuum bagged and heated until cured, resulting in a rigid composite structure matrix with the liner 16, the toe foam 31, and the thermo-formable plastic regions 30 all integrated into a one piece monocoque skate boot body 2. The positioning of the thermo-formable plastic regions 30, in the preferred embodiment, is displayed with a dotted line in FIG. 10B. These regions are positioned during the wet layup process. Because the monocoque skate boot body 2 is formed through, in a preferred embodiment, the hardening chemical reaction of epoxy, and the like, only a moderate amount of heat is required during the cure stage, which maintains the integrity of the foam liner 17 during fabrication. All other processes, as would be found in the prior art, utilize higher heat during fabrication, which would otherwise damage the foam liner 17. As described above this method of fabrication utilizes an internal foot last 35 with no rigid external shaping piece, such as a negative mold, as that used with a hot press die, and the like. The external shape is formed from a malleable/stretchable vacuum bag. Therefore, this method of fabrication provides the freedom to make micro adjustments to the internal foot last 35 so that the shape of the monocoque skate boot body 2 can be customized to the wearer's individual measurements prior to fabrication.

The main advantages of the one piece monocoque skate boot body 2 as compared to prior art is increased strength and stiffness, reduced weight, more response during skating, and better more direct power transfer during the skating push phase. Plus, increased manufacturing efficiency, and reduced reject rate.

Figure 11:
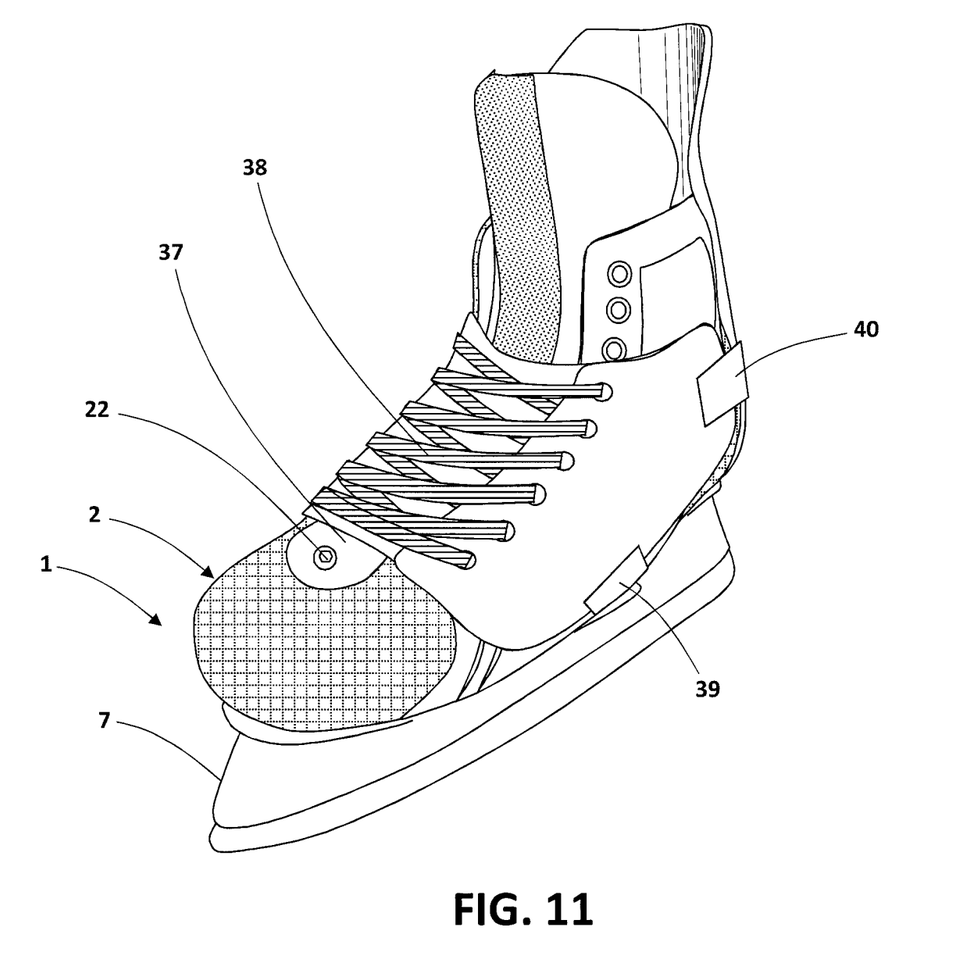
FIG. 11 is a perspective view of a skate boot with a rigid protective outer shell in accordance with an alternative embodiment of the present invention, with an attached skate blade and holder.

FIG. 11 shows a perspective view of the skate boot 1 and the attached skate blade holder 7 with a rigid protective outer shell 36 that can be removably attached to the monocoque skate boot body 2 through an attached tab 37 via the bolt 22 and the t-nut 23 (not shown) fastening system that in the preferred embodiment, also attaches the tongue fastening strip 21 (not shown). The rigid protective outer shell 36 is comprised of carbon fiber, aramid fiber, glass fiber, and the like, impregnated with a liquid resin that when activated cures to form a rigid composite structure matrix, with enough layers to withstand the impact of a fast moving hockey puck. The composition of the skate boot 1 in the area that the rigid protective outer shell 36 covers needs to be constructed with wearer comfort and function as primary manifestations, and therefore cannot be constructed to also adequately protect the foot from the impact of a fast moving hockey puck. Therefore, to ensure adequate protection to the wearer's foot the skate boot body 2 needs to be combined with the rigid protective outer shell 36 as shown in FIG. 11. To provide an aesthetic appeal to the wearer giving the impression of the rigid protective outer shell 36 not being there, non-functional laces 38 are positioned on the outer surface. The non-functional laces 38 do not have a functional purpose and are purely there to trick the wearer and other players into thinking the wearer is not using a rigid protective outer shell 36.

The rigid protective outer shell 36 can be hinged forward bending through the proximal end of tab 37, once the hook and loop attachment tabs 39 and 40 are released. This provides easy access for the wearer to the functional laces (not shown), which fasten the skate boot 1 to the wearer's foot.

Figure 12:
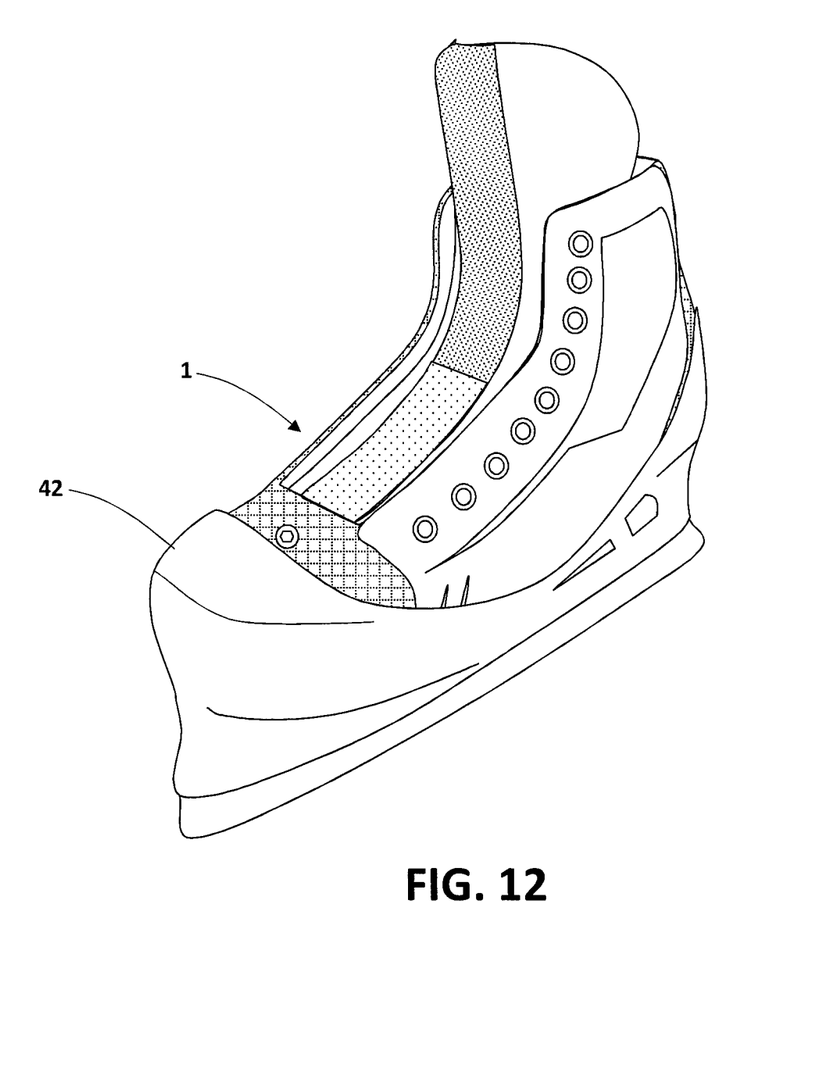
FIG. 12 is a perspective view of a skate boot in accordance with an alternative embodiment of the present invention, with an attached goalie blade holder cowling and blade.

FIG. 12 Shows an alternate embodiment wherein a goal skate cowling 42 is fastened to the outside of the skate boot 1 with rivets, bolts, and the like; to optimize the utility of the configuration as a goalie skate the tendon guard 12 could be omitted.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of fabricating a skate boot body for a skate boot in which the skate boot body comprises i) a sole portion for receiving an insole and a foot of a wearer on an inner side and an ice skate blade holder on an outer surface thereof, ii) a heel portion at one end of the sole portion for receiving a heel of the foot of the wearer, iii) an ankle portion for receiving ankles of the wearer, iv) a lower Achilles tendon portion for receiving a base of an Achilles tendon of the wearer, v) an upper Achilles tendon portion above said lower Achilles tendon portion, and vi) a cuff portion extending upwardly from sides of the sole portion for receiving a top of the foot, wherein the heel portion, the sole portion, the ankle portion, the lower Achilles tendon portion, the upper Achilles tendon portion and the cuff portion are integrally formed with one another as a monocoque structure, the method comprising:
   (a) providing a foot last;
   (b) positioning a liner portion, adapted to cushion the foot of the wearer in the skate boot body, on the foot last;
   (c) layering wet composite material over said liner portion; and
   (d) vacuum bagging and heating the wet composite material until the wet composite material has cured into a rigid composite structure matrix defining the monocoque structure of the skate boot body with said liner portion integrated therein.

2. The method according to claim 1 further including forming said liner portion of foam bonded to a material layer.

3. The method according to claim 1 including layering thermo-formable plastic pieces on said liner portion on the foot last prior to the layering the wet composite material onto the foot last.

4. The method according to claim 1 including inserting eyelets into eyelet holes in the cuff portion of the monocoque structure of the skate boot body for receiving a lace to tighten the monocoque skate boot body about the foot of the wearer.

5. The method according to claim 1 including i) providing a protruding build-out on the foot last in proximity to an Achilles tendon area of the foot last and layering the wet composite material about the protruding build-out on the foot last so as to define a recess on an inner surface of the monocoque structure of the skate boot body, and ii) mounting a bottom end of a tendon guard into the recess on the inner surface of the monocoque structure of the skate boot body such that the tendon guard is adapted to span an Achilles tendon of the wearer.

* * * * *